Patented Sept. 20, 1938

2,130,924

UNITED STATES PATENT OFFICE 2,130,924

COATING COMPOUND

Arthur W. Johnson and George H. Young, Pittsburgh, Pa., assignors to Stoner-Mudge, Inc., a corporation of Pennsylvania No Drawing. Application February 5, 1937, Serial No. 124,236

6 Claims. (Cl. 134—26)

This invention relates to a coating compound capable of forming protective coatings upon the surfaces of other bodies, and relates specifically to a coating compound consisting primarily of certain of those resinous polymeric vinyl compounds known commercially as Vinylite. These compounds, as is well known, are the polymers and co-polymers of various vinyl compounds, such polymers and co-polymers being of resinous nature. Amongst the resinous polymeric vinyl compounds there may be given as typical polyvinyl acetate, polyvinyl propionate, polyvinyl chloride, polyvinyl bromide, polyvinyl chlorobromide, polyvinyl chloro-acetate, polyvinyl chloro-propionate, and polyvinyl chloro-alcohol. Generally stated, the resin-type substance with which we are concerned consists of any polymer, co-polymer, or polymeric mixture of the compound responding to the formula $CH_2=CH-X$, in which X may be a halogen, the hydroxyl group, acetoxyl, propionoxyl, or in general any monocarboxylic acyloxyl group. In the ensuing claims the term polymer will be understood to be inclusive of polymers, co-polymers, and polymeric mixtures. And, specifically, we have found suited to our purpose those resinous products that result from the simultaneous polymerization of vinyl chloride and vinyl acetate.

The object of our invention is to add to such resinous polymeric vinyl compounds a substance which will serve to impart thermal stability to a film consisting primarily of the polymeric vinyl compounds. For example, a normal polymeric vinyl film deposited upon metal tends to decompose at relatively low temperatures if it is as heavy as is usual for films of this nature exceeding in weight 7 milligrams per square inch. The specific decomposition temperatures vary somewhat with different metal to which the film is applied. For some of the most used metals the decomposition temperatures may be given as follows:

| | ° F. |
|---|---|
| Tin plate | 300 |
| Iron | 290 |
| Zinc | 280 |
| Copper | 330 |

It is, therefore, a matter of desirability, and specifically our object herein, so to increase the thermal stability of the polymeric vinyl film that, as applied to such metals, or to other metals and materials, it will endure temperatures substantially higher than those noted without undergoing decomposition.

We have found that by adding to the resinous polymeric vinyl compound specifically named above a pitch containing one or more of the tar bases which boil at temperatures higher than 240° C. at atmospheric pressure, an applied coating of the mixture possesses greatly increased thermal stability, this increase in thermal stability being noticeable upon the addition of even a trace of the pitch. The term "tar base" is a chemical term, and defines any one of the higher pyridine base homologs boiling at atmospheric pressure above 240° C. that occur naturally in coal tar, natural asphalts, water-gas pitch, bone pitch, and other tarry materials.

Having further discovered that it is the tar bases of higher boiling range which give the desired effect, we are able to add these tar bases either as isolated products, in the form of a purified pitchy wax containing the bases, or in the form of a crude pitch. We have successfully utilized, to impart thermal stability to the Vinylite film, coal tar pitch, natural asphalt, bone pitch, and water-gas pitch, it being thus apparent that the tar bases are effective for our purpose, whether they be derived from natural or synthetic pitches, being typically similar in their general chemical structure and nitrogen content. In a companion application filed July 28, 1938, Serial No. 221,799, we claim a broader field of invention within which the invention of this application is a species.

We shall give the following exemplary procedure for increasing thermal stability of the Vinylite film, utilizing as typical of a tar base technical quinoline (boiling slightly above 240° C.), this being one of the higher boiling point pyridine bases derived from coal tar. Taking 100 grams of a 20% solution of the product of polymerization, the solvent being desirably a mixture of the typical ketone solvents for the polymeric vinyl resins, together with a mixed aromatic thinner, we added 0.2 gram of technical quinoline. The polymeric vinyl solution with the added technical quinoline was then spread on tin plate and was baked for 15 minutes at a temperature of 380° F. The applied film did not exhibit any decomposition at that temperature, and by testing we found that it was not until the film on the tin plate was subjected to a temperature closely approaching 400° F. that thermal decomposition began.

An equal proportional quantity of the other pyridine bases, boiling higher than technical quinoline, gives identical results. If a crude pitch be analogously used, 0.4 gram according to the example, or 2% the weight of the polymeric vinyl resin, in accordance with the general proportion, should be used in order to obtain a result identical with that obtained by the use of 0.2 gram of technical quinoline. If pitch-derived waxes be used, they having been deprived of a proportion of their tar base content in removal of carbon and other impurities of the pitch, they should be utilized in double the quantity of the pitch; that is, 4% as a general proportion and 0.8 gram in accordance with the example, in order to obtain a result identical with that obtained by use of the technical quinoline. It may be explained that in the base of crude pitch, and pitch-derived waxes, a large proportion of the content constitutes for our purpose merely a pitchy diluent for the tar base or bases supplied to the coating. For reasons of availability, however, it may under certain circumstances be desirable to utilize a crude pitch or pitch-derived wax, rather than to add technical quinoline or other tar bases in separated condition. In this connection it should be understood that the pitches are throughout their entire boiling range satisfactory for our purpose.

As an alternative to admixture of the thermal stabilizing material to the polymeric vinyl resin in solution, it may in any of its forms be milled in with the solid resin. Quantitatively there is no fixed upper limit to the percentage inclusion of the thermal stabilizer with the polymeric vinyl resin. Within reasonable limits, it is a fact that the increase in thermal stability attendant upon its use plots as a straight line with added increments of the stabilizer. There are, of course, practical limits to the inclusion of the stabilizer in any of its forms. Thus, it is obvious that the pitchy wax of the base should not be included in such proportion that the coating becomes a pitchy coating rather than a Vinylite film, and it is equally true that there would be no advantage in attempting to carry the endurable temperature to such point that the thermal stabilizing agent would itself decompose.

Increase in the thermal stability of a Vinylite film presents marked practical advantage, in that as so stabilized the film may be subjected to baking at increased temperatures, and as a result a marked improvement in adhesion to the surfaces being coated, and in resistance to moisture and other corrosive influences, is effected. Also as applied to a metal, the metal coated with a Vinylite film of increased thermal stability is capable, as a material or article, of being subjected to temperatures of increased severity without destruction of the coating thereon.

We claim as our invention:

1. A thermally stabilized coating compound consisting of a polymer of a substance responding to the formula $CH_2=CH-X$, in which X is a substance of a group consisting of the halogens, the hydroxyl group, and the monocarboxylic acyloxyl groups, and a pitch containing at least one tar base boiling above 240° C. at atmospheric pressure, such tar base being present in a ratio not exceeding two parts of tar base to one hundred parts of the first named substance.

2. A thermally stabilized coating compound comprising a polymer of a substance responding to the formula $CH_2=CH-X$, in which X is a substance of a group consisting of the halogens, the hydroxyl group, and the monocarboxylic acyloxyl groups, and a stabilizer consisting of a pitch containing at least one tar base boiling above 240° C. at atmospheric pressure in a diluent carrier of pitchy nature, such tar base being present in a ratio not exceeding two parts of tar base to one hundred parts of the first named substance.

3. A thermally stabilized coating compound comprising a polymer of a substance responding to the formula $CH_2=CH-X$, in which X is a substance of a group consisting of the halogens, the hydroxyl group, and the monocarboxylic acyloxyl groups, and a stabilizer consisting of technical quinoline, such stabilizer being present in a ratio not exceeding two parts of quinoline to one hundred parts of the first named substance.

4. A thermally stabilized coating compound comprising a polymer of a substance responding to the formula $CH_2=CH-X$, in which X is a substance of a group consisting of the halogens, the hydroxyl group, and the monocarboxylic acyloxyl groups, and a stabilizer consisting of a tar wax containing at least one tar base boiling above 240° C. at atmospheric pressure, such tar base being present in a ratio not exceeding two parts of tar base to one hundred parts of the substance first named.

5. A thermally stabilized coating compound comprising the resinous product of the polymerization of vinyl chloride and a stabilizer consisting of a pitch containing at least one tar base boiling above 240° C. at atmospheric pressure, such tar base being present in a ratio not exceeding two parts of tar base to one hundred parts of the resinous product.

6. A thermally stabilized coating compound comprising the resinous product of the simultaneous polymerization of vinyl chloride and vinyl acetate together with a stabilizer consisting of a pitch containing at least one tar base boiling above 240° C. at atmospheric pressure, such tar base being present in a ratio not exceeding two parts of tar base to one hundred parts of the resinous product.

ARTHUR W. JOHNSON.
GEORGE H. YOUNG.